(12) United States Patent
Radivojevic

(10) Patent No.: US 8,779,307 B2
(45) Date of Patent: Jul. 15, 2014

(54) GENERATING PERCEPTIBLE TOUCH STIMULUS

(75) Inventor: Zoran Radivojevic, Cambridge (GB)

(73) Assignee: Nokia Corporation, Espoo (FI)

( * ) Notice: Subject to any disclaimer, the term of this patent is extended or adjusted under 35 U.S.C. 154(b) by 1047 days.

(21) Appl. No.: 12/587,245

(22) Filed: Oct. 5, 2009

(65) Prior Publication Data

US 2011/0079449 A1   Apr. 7, 2011

(51) Int. Cl.
*G06F 3/041* (2006.01)

(52) U.S. Cl.
USPC .................................................. 178/18.03

(58) Field of Classification Search
USPC ..................................................... 178/18.03
See application file for complete search history.

(56) References Cited

U.S. PATENT DOCUMENTS

| | | | |
|---|---|---|---|
| 4,020,328 A | 4/1977 | Bradam | 235/146 |
| 5,181,030 A | 1/1993 | Itaya et al. | 341/20 |
| 5,709,219 A | 1/1998 | Chen et al. | 128/782 |
| 5,869,791 A | 2/1999 | Young | 178/20.01 |
| 6,655,792 B2 | 12/2003 | Benson et al. | 347/86 |
| 7,111,495 B2 | 9/2006 | Rapp et al. | 73/24.01 |
| 7,176,903 B2 | 2/2007 | Katsuki et al. | 345/173 |
| 7,221,981 B2 | 5/2007 | Gliner | 607/116 |
| 7,385,443 B1 * | 6/2008 | Denison | 330/9 |
| 8,626,283 B1 | 1/2014 | Zhou | 607/3 |
| 2002/0022873 A1 | 2/2002 | Erickson et al. | 607/117 |
| 2004/0095330 A1 | 5/2004 | Ling et al. | 345/173 |
| 2004/0131998 A1 | 7/2004 | Marom et al. | 434/236 |
| 2004/0207542 A1 | 10/2004 | Chang et al. | 341/20 |
| 2005/0131490 A1 | 6/2005 | Palanker | 607/57 |
| 2005/0187454 A1 | 8/2005 | Gabl et al. | 600/372 |
| 2006/0061545 A1 | 3/2006 | Hughes et al. | 345/156 |
| 2006/0085049 A1 | 4/2006 | Cory et al. | 607/48 |
| 2006/0085056 A1 | 4/2006 | Schouenborg | 607/148 |
| 2006/0149341 A1 | 7/2006 | Palti | 607/63 |
| 2006/0241718 A1 | 10/2006 | Tyler et al. | 607/45 |
| 2008/0157893 A1 | 7/2008 | Krah | 331/177 R |
| 2008/0255434 A1 | 10/2008 | Hayter et al. | 600/309 |
| 2009/0002328 A1 | 1/2009 | Ullrich et al. | 345/173 |
| 2009/0079550 A1 | 3/2009 | Makinen et al. | 340/407.2 |
| 2009/0085878 A1 | 4/2009 | Heubel et al. | 345/173 |

(Continued)

FOREIGN PATENT DOCUMENTS

DE   10 2009 020 769 B3   7/2010
EP   2 000 885 A1   12/2008

(Continued)

OTHER PUBLICATIONS

Yamamoto, et al., "Electrostatic Tactile Display with Thin Film Slider and Its Application to Tactile Telepresentation Systems", IEEE Transactions on Visualization and Computer Graphics, vol. 12, No. 2, (Mar./Apr. 2009), (pp. 168-177), XP003026562.

(Continued)

*Primary Examiner* — William Boddie
*Assistant Examiner* — Andrew Schnirel
(74) *Attorney, Agent, or Firm* — Harrington & Smith

(57) ABSTRACT

Apparatus including: a body portion having a surface comprising a first surface electrode and a second surface electrode, spaced from the first surface electrode, and a controller configured to apply a time varying potential difference between the first surface electrode and the second surface electrode and configured to control at least the time variation in the potential difference.

20 Claims, 3 Drawing Sheets

(56) References Cited

U.S. PATENT DOCUMENTS

| | | | |
|---|---|---|---|
| 2009/0128503 A1 | 5/2009 | Grant et al. | 345/173 |
| 2009/0167704 A1 | 7/2009 | Terlizzi et al. | 345/173 |
| 2009/0174671 A1 | 7/2009 | Tachi et al. | 345/173 |
| 2009/0243632 A1 | 10/2009 | Ozawa | 324/679 |
| 2009/0293631 A1 | 12/2009 | Radivojevic | 73/774 |
| 2009/0322496 A1 | 12/2009 | Da Costa | 340/407.2 |
| 2010/0079403 A1 | 4/2010 | Lynch et al. | 345/174 |
| 2010/0085169 A1 | 4/2010 | Poupyrev et al. | 340/407.2 |
| 2010/0152794 A1 | 6/2010 | Radivojevic et al. | 607/2 |
| 2010/0231550 A1 | 9/2010 | Cruz-Hernandez et al. | 345/174 |
| 2010/0265210 A1 | 10/2010 | Nakanishi et al. | 345/174 |
| 2011/0032088 A1 | 2/2011 | Kim et al. | 340/407.1 |
| 2011/0037707 A1 | 2/2011 | Radivojevic et al. | 345/173 |
| 2011/0127880 A1 | 6/2011 | Murphy et al. | 310/317 |
| 2011/0279250 A1 | 11/2011 | Ryhanen et al. | 340/407.2 |
| 2011/0286156 A1 | 11/2011 | Beecher et al. | 361/679.01 |
| 2012/0038559 A1 | 2/2012 | Radivojevic et al. | 345/173 |
| 2012/0293441 A1 | 11/2012 | Eldering | 345/173 |

FOREIGN PATENT DOCUMENTS

| | | |
|---|---|---|
| JP | 2005/276089 A | 10/2005 |
| JP | 2008/532564 A | 8/2008 |
| WO | WO 87/07825 A1 | 12/1987 |
| WO | WO 2006/041648 A2 | 4/2006 |
| WO | WO 2007/010441 A2 | 1/2007 |
| WO | WO 2008/037275 A1 | 4/2008 |
| WO | WO 2009/037379 A1 | 3/2009 |
| WO | WO 2009/141502 A1 | 11/2009 |
| WO | WO 2009/158074 A1 | 12/2009 |
| WO | WO 2010/066817 A2 | 6/2010 |

OTHER PUBLICATIONS

Peter B.L. Meijer, "Augmented Reality for the Totally Blind", Nov. 2010, (4 pages).

"Capacitively Coupled Electromagnetic Field Therapy as a Treatment Modality in Veterinary Medicine" http://www.scitechvet.com/articles.html, retrieved Dec. 30, 2008.

"Induced Current Constraints and Capacitive Effects in Inductive Nerve Stimulation"—McCarthy S, Haradem D, IEEE Transactions on Biomedical Engineering, vol. 37, Issue 6, Jun. 1990, pp. 598-605, http://ncbi.nlm.nih.gov/pubmed/2354841.

"Noninvasive Neuroelectronic Interfacing with Synaptically Connected Snail Neurons Immobilized on a Semiconductor Chip", Gunther Zeck, Peter Fromherz, PNAS Aug. 28, 2001 vol. 98 No. 18 10457-10462, http://www.pnas.org/content/98/18/10457.full.pdf+html.

"Capacitive Stimulatory Effect in Magnetic Stimulation of Nerve Tissue" Ueno S. Matsumoto S, Harada K, Oomura Y, IEEE Transactions on Magnetics, vol. 14, Issue5, Sep. 1978 pp. 958-960, http://ieeexplore.ieee.org/stamp/jsp?amumber=01059800.

http://venturebeat.com/2008/05/30/startup-senseg-promises-game-changing-tactile-technology/-retrieved Jan. 12, 2009.

Kaczmarek, et al., "Polarity Effect in Electrovibration for Tactile Display", NIH Public Access. Author Manuscript, IEEE Trans Boimed, (Oct. 2006), (pp. 1-17).

Nice, K. et al., "How Digital Cameras Work", Nov. 29, 2006, HowStuffWorks.com, <http://electronics.howstuffworks.com/cameras-photography/digital/digital-camera.htm> Feb. 19, 2013, pg. 1-6.

Bao, Oliver et al., "Teslatouch: Electrovibration for Touch Surfaces", (Oct. 4, 2010), (10 pages).

"Series E: Overall Network Operation, Telephone Service, Service Operation And Human Factors", ITU-T Recommendation E.161, Telecommunication Standardization Sector of ITU, Feb. 2001, 14 pgs.

http://www.nokia.com/about-nokia/research/demos/the-morph-concept; "Develop for Lumia", Feb. 25, 2014, 9 pgs.

* cited by examiner

GENERATING PERCEPTIBLE TOUCH STIMULUS

FIELD OF THE INVENTION

Embodiments of the present invention relate to haptics and the generation of perceptible touch stimulus.

BACKGROUND TO THE INVENTION

Electromechanical actuators, such as vibrators, are currently used to create a touch stimulus. However, they have a number of drawbacks.

BRIEF DESCRIPTION OF VARIOUS EMBODIMENTS OF THE INVENTION

According to various, but not necessarily all, embodiments of the invention there is provided an apparatus comprising: a body portion having a surface comprising a first surface electrode and a second surface electrode, spaced from the first surface electrode, and a controller configured to apply a time varying potential difference between the first surface electrode and the second surface electrode and configured to control at least the time variation in the potential difference.

According to various, but not necessarily all, embodiments of the invention there is provided a method comprising: applying a time varying potential difference between a first surface electrode of a body of an apparatus and a second surface electrode of the body of the apparatus; and controlling at least the time variation in the potential difference.

According to various, but not necessarily all, embodiments of the invention there is provided a record carrier tangibly embodying a computer program comprising computer program instructions, which when loaded in a processor enable the processor to: enable application of a time varying potential difference between a first surface electrode of a body of an apparatus and a second surface electrode of the body of the apparatus; and According to various, but not necessarily all, embodiments of the invention there is provided an electrically modulated moving touch stimulus apparatus comprising: a body portion having a smooth surface comprising an optically transparent surface electrode; and a controller configured to generate a time varying electric field at the surface electrode such that in use electric current flow via the surface electrode does not exceed 100 µA and configured to control at least the time variation in the electric field.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

Figure 1A:
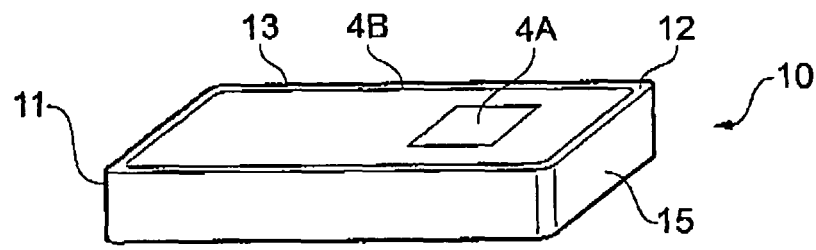
FIG. 1A schematically illustrates an example of an apparatus from a top, side perspective.

The Figures illustrate examples of an apparatus 10 comprising: a body portion 11 (e.g. FIGS. 1A, 1B, 5, 6) having a surface 12 comprising a first surface electrode 2 and a second surface electrode 4, spaced from the first surface electrode 2, and a controller 30 (e.g. FIG. 4) configured to apply a time varying potential difference 24 (e.g. FIGS. 3A, 3B) between the first surface electrode 2 and the second surface electrode 4 and configured to control at least the time variation in the potential difference 24.

In use, a user 40 (e.g. FIGS. 5 and 6) holds the apparatus 10 in one hand or two hands or otherwise contacts the apparatus using two different body portions. One portion of the user's body contacts the first surface electrode 2 and another portion of the user's body (typically a digit) contacts a second surface electrode 4. The two points of contact close an electric circuit through the user's body. The second surface electrode 4 has an associated time varying electric field that varies with the applied time varying potential difference. The electric field produces a time-varying force that does not directly create a touch stimulus at an overlying and touching digit of a user when the digit is stationary but does provide a touch stimulus indirectly when the digit of the user, while in contact with the second surface electrode 4, is traced over the second surface electrode 4. It is believed that the time varying force modulates the frictional force applied to the touching digit, which creates a modulating shear force at the surface of the digit when the digit is traced over the second surface electrode 4. The time varying touch stimulus perceived by the user as the digit is traced over the second surface electrode 4 creates a perceived 'texture' that can be modified by controlling at least the time variation of the applied potential difference.

In this document the term 'electrically modulated moving touch stimulus' (EMMTS) will denote a touch stimulus at a user's body part that is controlled using an apparatus to apply a time varying potential difference and that is perceptible to a user when there is relative motion between the body part and the apparatus while there is touch contact between the body part and the apparatus but is not perceptible to a user when there is not relative motion between the body part and the apparatus while there is touch contact between the body part and the apparatus.

The current that flows as a consequence of the applied time varying potential difference is typically less that 5 µA which is less that the current required for direct activation of nerves or muscle.

EMMTS may therefore be viewed as electrically modulating (using the time varying potential difference) a nerve stimulation created by an alternative method (e.g. dragging a digit over a surface).

Figure 1B:
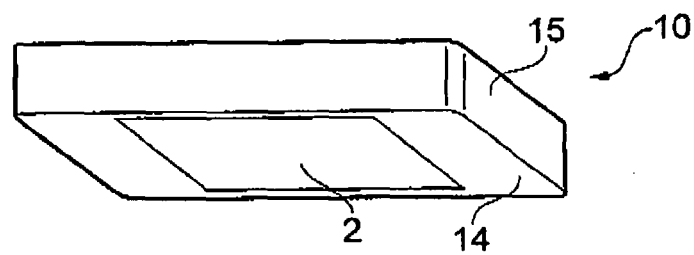
FIG. 1B schematically illustrates the example of the apparatus from a bottom, side perspective.

FIG. 1A schematically illustrates an example of an apparatus 10 from a top, side perspective and FIG. 1B schematically illustrates the example of the apparatus from a bottom, side perspective.

The apparatus 10 comprises a body 11. The body 11 is typically rigid or semi-rigid and provides shape to the apparatus 10. The body 11 has an exterior surface 12 that defines the exterior surface area of the body 11.

In the example shown, the apparatus 10 is not illustrated as being capable of changing its shape by, for example, have moving parts. If the apparatus 10 does have such moving parts, then surface 12 need not be a surface that is continuously at the exterior of the apparatus but may be a surface that is exposed at the exterior of the apparatus 10 by moving a part of the apparatus.

In the illustrated example, but not necessarily in all examples, the surface 12 provides a front face 13, a rear face 14 and side faces 15. The faces in this example define an interior volume that may house electronic components such as the controller 30.

The front face 13, in this example, presents a moving-touch electrode 4A over which a digit of a user is moved during EMMTS for that electrode and a moving-touch electrode 4B over which a digit of a user is moved during EMMTS for that electrode.

The moving-touch electrodes 4A, 4B are exposed at the front face 13 for touch contact. As described in more detail below, the electrodes 4A, 4B may comprise a conductive layer covered by an appropriate dielectric layer, which may or may not be optically transparent. Therefore although the electrode is exposed at the front face 13 the conductive layer is not necessarily exposed.

The moving-touch electrodes 4A, 4B are each in register with a smooth portion of the surface 12 of the front face 13. Smooth in this context means that the surface 12 has a substantially uniform coefficient of friction across the smooth portion. The coefficient of friction may also be low. The substantially uniform coefficient of friction ensures that changes in the frictional force applied to a moving digit that is in contact with the smooth portion of the surface 12 is predominantly as a result of the electric modulation applied to the moving-touch electrode 4A, 4B. The whole of the surface 12 may be smooth and the smooth portions associated with the moving-touch electrodes do not necessarily have to be physically different from other portions of the surface 12.

The moving-touch electrodes 4A, 4B need to extend in at least one direction a distance that is sufficient to allow a digit of a user to be physically traced in that direction. The extension of the moving-touch electrodes 4A, 4B in that direction is sufficient, bearing in mind the rate at which the time varying potential vary in time, to allow a user to trace their digit over the moving-touch electrode at a reasonable rate and be able to feel the modulations. If periodic modulations are used, it may be necessary to have greater extension for lower frequency ranges. The extension is sized and the time variation of the potential difference is controlled to provide to a digit of a user that is traced across the moving-touch electrode a time varying touch stimulus.

In the illustrated example, the moving-touch electrode 4A is a 'patch' whereas the moving-touch electrode 4B is an elongate rail.

The patch moving-touch electrode 4A is designed such that EMMTS can be achieved irrespective of the direction in which a digit contacting the patch moving-touch electrode 4A is traced across the surface of the patch moving-touch electrode 4A. In this example, the patch moving-touch electrode 4A and its associated smooth surface portion extend over a two dimensional area that has a minimum dimension that is greater than 1 mm. and a maximum dimension that is greater than 1 cm. Notice that the electrode can have a form factor such as, for example, a 1 mm wide strip which is 20-30 mm long.

The elongate moving-touch electrode 4A is designed such that EMMTS can be achieved only if a digit contacting the patch moving-touch electrode 4A is traced across the surface of the patch moving-touch electrode 4A in its elongate direction. In this example, the elongate moving-touch electrode forms a frame circumscribing the front face 13.

Figure 4:
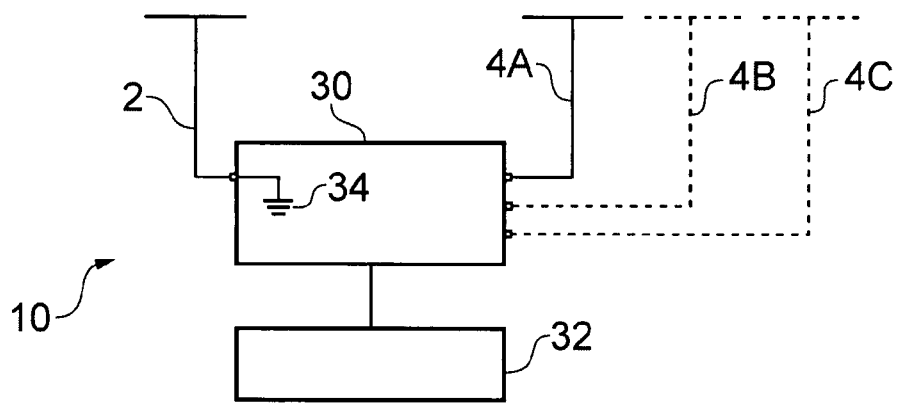
FIG. 4 schematically illustrates an example of functional components of the apparatus.

The rear face 14 is a face of the apparatus 2 that presents a rear surface electrode 2 which is used to close the electrical circuits created by any of the moving-touch electrodes 4. The rear surface electrode 2 may be a common reference electrode connected to a ground or earth 34 of the apparatus. as illustrated in FIG. 4.

Figure 5:
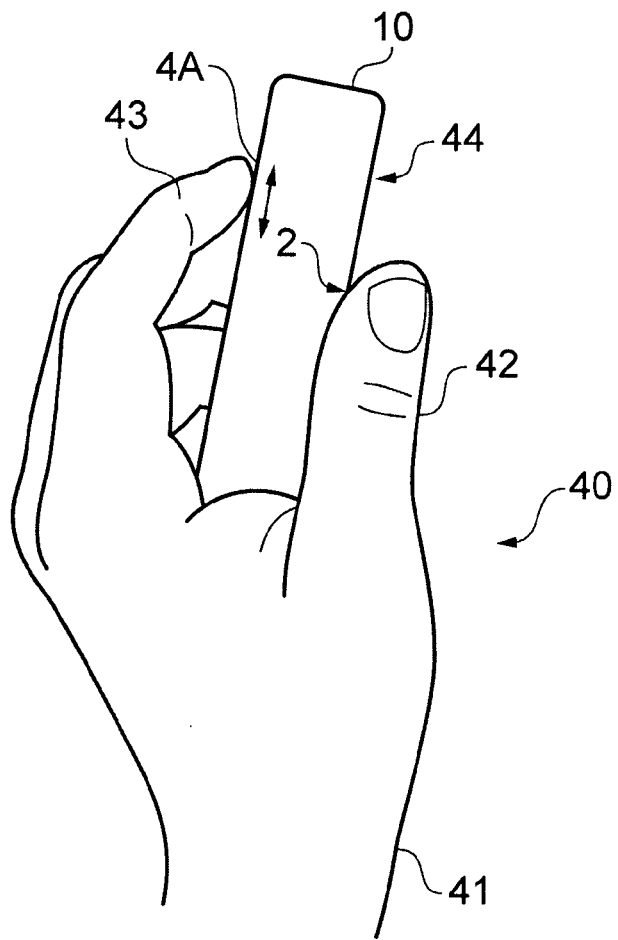
FIG. 5 schematically illustrates use of one example apparatus
Figure 6:
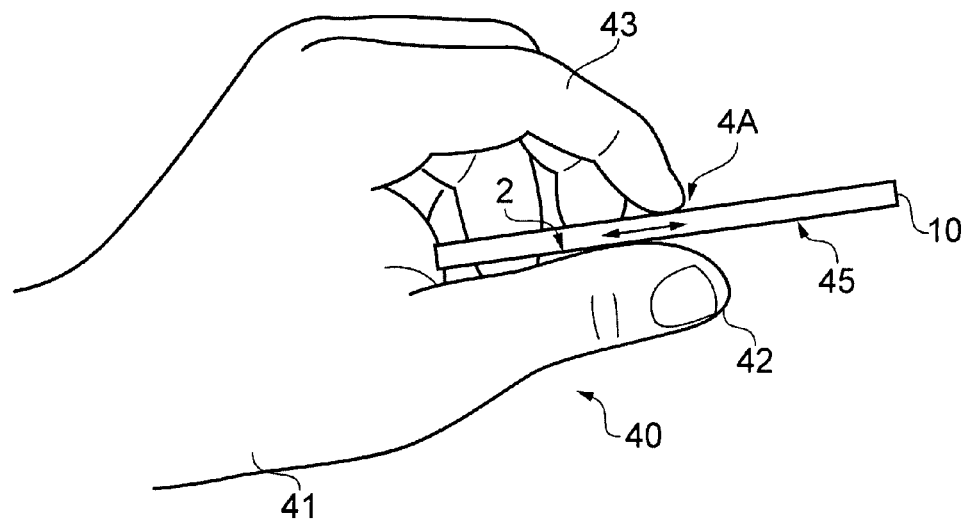
FIG. 6 schematically illustrates use of another example apparatus

The grounding surface electrode 2 may be sized and positioned to be touched by a user when the apparatus 10 is held in a user's hand as illustrated in FIGS. 5 and 6.

Figure 2:
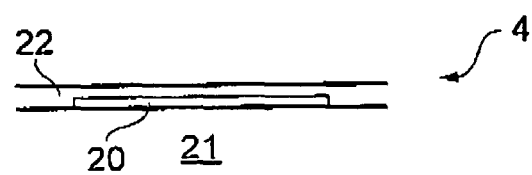
FIG. 2 schematically illustrates a cross-section though an example of a surface electrode.

FIG. 2 schematically illustrates a cross-section though an example of a surface electrode. The illustrated electrode may be used as a moving touch electrode 4A, 4B or, separately, as a grounding electrode 2.

In this example, the surface electrode comprises a conductive layer 20 that overlies a substrate 21 and a dielectric layer 22 that overlies the conductive layer 20. The dielectric layer 22 insulates the conductive layer 20 creating an 'insulated' surface electrode. Consequently, when a user touches the surface electrode there is no galvanic connection between the conductive later 20 and the user.

The substrate 21 may be any arbitrary substrate that will support the conductive layer 20. In some embodiments it may be flexible in other embodiments it may be the body 11 of the apparatus 10.

The conductive layer 20 may be formed from any suitable conducting material. It may, for example, be formed from metal such as aluminum (Al), Copper (Cu), gold (Au) etc. It may for example be indium-tin-oxide (ITO). In some embodiments, the material and thickness of the conductive layer may be chose so that it is substantially optically transparent and the body 11 of the apparatus 10, which acts as substrate 21, can viewed through it. In other embodiments, the body 11 may be metallic and provide the conductive layer 20 without a substrate 21.

The dielectric layer 22 may be a dielectric layer with a high relative permittivity such as Hafnium oxide ($HfO_2$), aluminum oxide ($Al_2O_3$) and titanium oxide ($TiO_2$). The dielectric layer may provide a hard, smooth surface for contact with a user's digit.

The dielectric layer 22 may in some embodiments be optically transparent.

The combination of the first conductive layer 20, the dielectric layer 22 and the substrate 21 (if present) may be flexible.

Although the grounding electrode 2 may be formed as an insulated surface electrode as illustrated in FIG. 2, in other embodiments it is formed as a galvanic surface electrode. A galvanic surface electrode is a surface electrode that has an exposed conductive layer (no dielectric covering) so that when a user touches the surface electrode there is a galvanic connection between the conductive later and the user.

A moving touch electrode 4 should not make a galvanic connection to a user as this will significantly reduce the potential difference between the moving touch electrode 4 and the user which is used for EMMTS.

In the example illustrated in FIG. 2, the moving touch electrode 4 is an insulated surface electrode. The insulation allows an electrostatic potential to build-up.

In other embodiments, the moving touch electrode may have an exposed conductive layer (no dielectric covering). In these embodiments, a digit of a user that touches the moving touch electrode has an attached dielectric membrane. The dielectric membrane may, for example, be provided by a consumable product that is worn on the digit for the purpose of EMMTS or some other purpose. The consumable products may be stacked in a dispenser apparatus or cartridge for a dispenser apparatus. The dielectric membrane may be formed from a polymer such as poly vinyl chloride or polythene (e.g. Clingfilm™) or cellulose film (e.g. Cellophane™). The dielectric membrane typically has a thickness of less than 10 µm. The dielectric membrane is typically stretched over the skin surface of the digit so that there is close adherence between the skin and dielectric film.

FIG. 4 schematically illustrates an example of some functional components of an apparatus 10.

The apparatus 10 comprises one or more moving touch electrodes 4A, 4B, 4C, a controller 30, an energy source 32 and a grounding electrode 2 connected to a reference ground or earth 32.

The controller 30 is configured to apply a time varying potential difference between a (or each) moving touch electrode 4A, 4B, 4C and the grounding surface electrode 2. The controller 30 is also configured to control at least the time variation in the potential difference. The system operates in a regime which is using 1-100 µA) When the controller 30 is applying a time varying potential difference to enable EMMTS the electric current flow via the surface electrode may be controlled so that it does not exceed 100 µA.

If the controller 30 is configured to apply a time varying potential difference to multiple moving touch electrodes 4A, 4B, 4C, then it may be configured to provide a different time varying potential difference to each of the multiple moving touch electrodes 4. It may also be configured to individually and independently control at least the time variations in the different potential differences.

As the power consumption of the controller 30 is low when enabling EMMTS because of the very low electric current flow, it is possible to have EMMTS always enabled. The controller 30 is then configured to continuously apply a time varying potential difference between the moving-touch electrode(s) 4 and the grounding surface electrode 2 when the apparatus 10 is switched on or if desired even when the device is switch off.

Figure 3A:
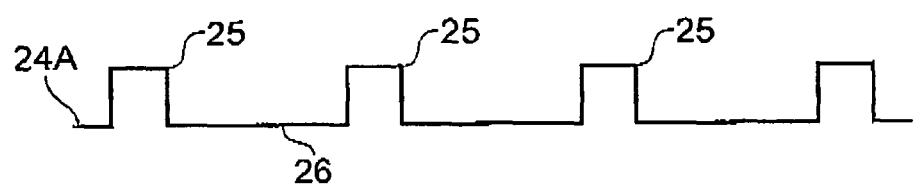
FIG. 3A schematically illustrates an example of a first applied periodic potential difference.
Figure 3B:
FIG. 3B schematically illustrates an example of a second applied periodic potential difference.

FIGS. 3A and 3B schematically illustrates examples of a time varying potential difference that could be applied by the controller 30. FIG. 3A schematically illustrates an example of a first applied periodic potential difference 24A and FIG. 3B schematically illustrates an example of a second applied periodic potential difference 24B.

In this example, the controller 30 has controlled the time variation in the potential difference by increasing the frequency of the periodic potential difference between FIGS. 3A and 3B.

In the illustrated example, the potential difference 24A is a series of regular top-hat pulses separated by regular periods T including gaps 26. Each pulse can be characterized by its height H and its width W. The train of pulse can be characterized by {H, W, T}. The controller 30 may for example control the time variation in the potential difference by controlling one or more of H, W, T. The train of pulses can then be characterized by {H(t), W(t), T(t)}, where H(t) indicates time variation of the pulse height, W(t) indicates time variation of the pulse width and T(t) indicates time variation of the pulse period.

In other implementations, the potential difference may be a sinusoid signal which is then characterized by {H(t), T(t)}.

It is believed that it is the change in electric field/frictional force generated by the potential difference that has most effect on user perception. Therefore, top-hat pulses as illustrated in FIGS. 3A and 3B may be preferred because of the rapid increase in potential difference creates an impulse modulation that is easily perceived using EMMTS. Furthermore, the time difference between the impulses creates a periodic surface 'texture' that is dependent upon the period T(t) and the speed of movement of a user's digit. The controller 30 by time modulating T(t) can therefore convey information to a user using EMMTS.

FIG. 5 schematically illustrates use of one example apparatus 10. In this example, the apparatus 10 is a hand-portable electronic apparatus 44. The user 40 holds the apparatus 10 using a hand 41. When held, the thumb 42 of the user's hand 41 contacts the grounding surface electrode 2 and the finger 43 of the user's same hand is positioned over a moving-touch electrode 4. The user 40 is able to trace the tip of the finger 43 over the moving-touch electrode 4 while it is in contact with the moving-touch electrode 4. The controller 30 is simultaneously applying a time varying potential difference between the moving touch electrode 4 and the grounding electrode 2 which the user perceives as 'texture' via EMMTS.

The controller 30 by controlling the time variation in the potential difference. can convey information to a user. Referring back to FIGS. 3A and 3B, for example, a change in the periodicity of the pulses 25 changes the periodicity of the 'texture' perceived at a user's digit using EMMTS.

The 'texture' may be controlled by the controller 30 to indicate a status of the hand-portable electronic apparatus 44. The controller 30 may be programmed to provide different 'textures' in different circumstances.

For example, the controller 30 may provide a periodically varying potential difference that has a variable periodicity (frequency). The frequency may, for example, be varies between 1 and 100 Hz to give a qualitative indication of an event such as arrival of new message (5 Hz), missed call (20 Hz) and a proximity alert (100 Hz).

As another example, the controller 30 may provide a periodically varying potential difference that has a variable periodicity (frequency). The frequency may, for example, be varies between 1 and 1 kHz to give a quantitative indication. For example one event may be indicated at 3 Hz, a few events (2-4) may be indicated at 20 Hz, many events (5-20) may be indicated at 100 Hz and lots of events (>100) may be indicated at 500 Hz.

In this or other embodiments, the hand-portable electronic apparatus 44 may have a key pad and each key in the keypad have an individual moving-touch electrode 4 that is individually controlled by the controller 30. Each key would therefore have a different texture which could be used to indicate its function. The different textures could be achieved by using a regularly periodic potential difference In another embodiment by using electrical modulation with a frequency of greater than 1 kHz, an audio output can be generated in addition to the EMMTS.

FIG. 6 schematically illustrates use of another example apparatus 10. In this example, the apparatus 10 is a card apparatus 45. The user 40 holds the card apparatus 10 between a thumb 42 of the user's hand 41 and a finger 43 of the same hand. The thumb 42 or finger 43 contacts the grounding surface electrode 2 and the finger 43 or thumb 42 contacts the moving-touch electrode 4. The user 40 by moving their finger or thumb is able to trace the tip of a digit over the moving-touch electrode 4 while it is in contact with the moving-touch electrode 4. The controller 30 is simultaneously applying a time varying potential difference between the moving touch electrode 4 and the grounding electrode 2 which the user perceives as 'texture' via EMMTS.

The controller 30 by controlling the time variation in the potential difference can convey information to a user. Referring back to FIGS. 3A and 3B, for example, a change in the periodicity of the pulses 25 changes the periodicity of the 'texture' perceived at a user's digit using EMMTS.

The 'texture' may be controlled to the controller 30 to indicate a status of the card apparatus 45.

As an example, the controller 30 may provide a periodically varying potential difference that has a variable periodicity (frequency). The frequency may, for example be a numerical indicator indicating a number of items or a financial indicator which might indicate credit or money.

In another embodiment (not illustrated), the apparatus 10 may be a user input for a control system. It may for example be a steering wheel, a gear shift stick, bicycle handles etc that uses EMMTS to convey information to a user via tactile stimulus.

Figure 7:
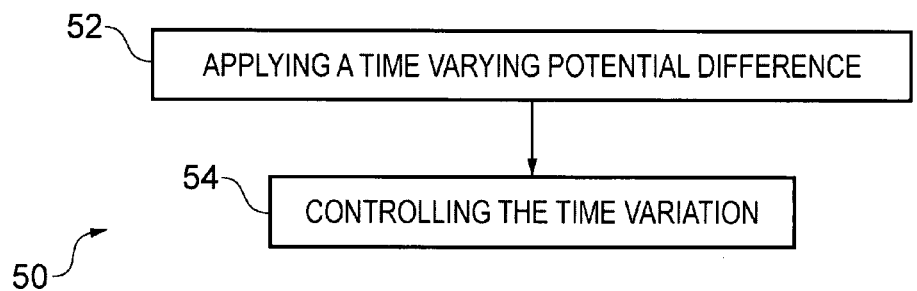
FIG. 7 schematically illustrates a method.

FIG. 7 schematically illustrates a method 50.

At block 52, the controller 30, applies a time varying potential difference between a moving touch electrode 4 of a body 11 of an apparatus 10 and an another electrode 2 of the body 11 of the apparatus 10.

At block 54, the controller 54 changes at least the time variation in the potential difference to convey information to a user. The change may be a change in periodicity of a periodic potential difference applied between electrodes.

The controller 30 may be implemented using instructions that enable hardware functionality, for example, by using executable computer program instructions in a general-purpose or special-purpose processor that may be stored on a computer readable storage medium (disk, memory etc) to be executed by such a processor.

Figure 8:
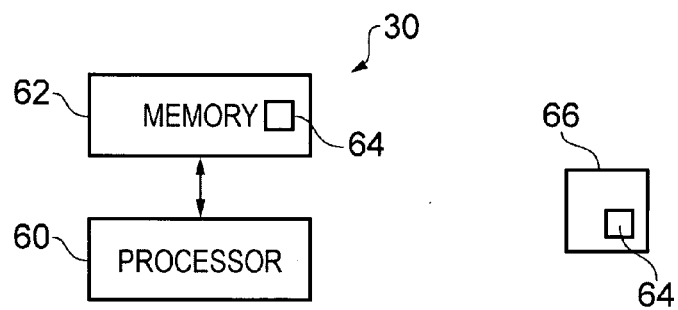
FIG. 8 schematically illustrates an example of one implementation of a controller for the apparatus.

FIG. 8 schematically illustrate an example of one implementation of a controller for the apparatus. The controller 30 comprises a processor 60 and a memory 62. It also comprises a signal generator controlled by the processor 60 to apply different time varying potential differences across one or more moving-touch electrodes and the reference electrode.

The processor 60 is configured to read from and write to the memory 62. The processor 60 may also comprise an output interface via which data and/or commands are output by the processor 60 and an input interface via which data and/or commands are input to the processor 60.

The memory 62 stores a computer program 64 comprising computer program instructions that control the operation of the controller 30 when loaded into the processor 60. The computer program instructions 64 provide the logic and routines that enables the apparatus to perform the methods illustrated in FIG. 7. The processor 60 by reading the memory 62 is able to load and execute the computer program 64.

The computer program may arrive at the controller 30 via any suitable delivery mechanism 66. The delivery mechanism 66 may be, for example, a computer-readable storage medium, a computer program product, a memory device, a record medium such as an article of manufacture that tangibly embodies the computer program 64. The delivery mechanism may be a signal configured to reliably transfer the computer program 64.

Although the memory 62 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The controller 30 may be provides as a module. A moving touch electrode may also be provided as a module. A reference electrode may also be provided as a module. As used here 'module' refers to a unit or apparatus that excludes certain parts/components that would be added by an end manufacturer or a user.

The blocks illustrated in the FIG. 7 may represent steps in a method and/or sections of code in the computer program 64. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A hand-portable apparatus comprising:
   a body portion having a surface comprising a first surface electrode and a second surface electrode, spaced from the first surface electrode, and
   a controller configured to apply a time varying potential difference between the first surface electrode and the second surface electrode and configured to control at least the time variation in the potential difference,
   wherein the controller is configured to apply the time varying potential difference such that, in use, electric current not exceeding 100 μA flows via the first and second surface electrodes to a digit of a user, providing a touch stimulus to the user that is perceptible only when there is relative motion between the digit and the apparatus while there is touch contact between the digit and the surface of the apparatus.

2. The apparatus as claimed in claim 1, wherein the second surface electrode is configured to provide a common electrostatic potential across a smooth portion of the surface that varies with the time varying potential difference.

3. The apparatus as claimed in claim 2, wherein the smooth portion is sized and the time variation of the potential difference is controlled to provide to a digit of a user that is traced across the smooth portion a time varying touch stimulus.

4. The apparatus as claimed, in claim 3, wherein the time varying touch stimulus is provided by frictional shear force modulated by the time varying common electrostatic potential.

5. The apparatus as claimed in claim 2, wherein the smooth portion extends over a two dimensional area that has a minimum dimension that is greater than 1 mm and a maximum dimension that is greater than 1 cm.

6. The apparatus as claimed in claim 1, wherein the first electrode is sized and positioned to be touched automatically by a user when the apparatus is held normally.

7. The apparatus as claimed in claim 1, wherein the first electrode is positioned on the rear of the apparatus.

8. The apparatus as claimed in claim 1, wherein the controller is configured to apply a periodic potential difference between the first surface electrode and the second surface electrode.

9. The apparatus as claimed in claim 8, wherein the controller is configured to vary a periodicity of the periodic potential difference.

10. The apparatus as claimed in claim 8, wherein a periodicity of the potential difference is provided by oscillations in a magnitude of the applied potential difference.

11. The apparatus as claimed in claim 1, wherein the second surface electrode comprises a conductive layer and an exterior dielectric layer covering the conductive layer.

12. The apparatus as claimed in claim 11, wherein the exterior dielectric layer is transparent.

13. The apparatus as claimed in claim 12, wherein the exterior dielectric layer is less than 10 μm thick.

14. The apparatus as claimed in claim 1, wherein the controller is configured to continuously apply a time varying potential difference between the first surface electrode and the second surface electrode when the apparatus is active.

15. The apparatus as claimed in claim 1, the body is configured to house electronic components or the body is configured to have the dimensions of a card or the body is configured as a user input for a control system.

16. A method comprising:
applying a time varying potential difference between a first surface electrode of a body of a hand-portable apparatus and a second surface electrode of the body of the apparatus; and
controlling at least the time variation in the potential difference,
wherein the time varying potential difference is applied such that, in use, electric current not exceeding 100 μA flows via the first and second surface electrodes to a digit of a user, providing a touch stimulus to the user that is perceptible only when there is relative motion between the digit and the apparatus while there is touch contact between the digit and the surface of the apparatus.

17. The method as claimed in claim 16, comprising:
applying a periodic potential difference between the first surface electrode and the second surface electrode and varying a periodicity of the periodic potential difference.

18. The method as claimed in claim 16, further comprising creating relative movement between the body of the second surface electrode and the skin of a user that contacts the second surface electrode.

19. A record carrier tangibly embodying a computer program comprising computer program instructions, which when loaded in a processor enable the processor to:
enable application of a time varying potential difference between a first surface electrode of a body of a hand-portable apparatus and a second surface electrode of the body of the apparatus; and
enabling controlling of at least the time variation in the potential difference,
wherein the time varying potential difference is applied such that, in use, electric current not exceeding 100 μA flows via the first and second surface electrodes to a digit of a user, providing a touch stimulus to the user that is perceptible only when there is relative motion between the digit and the apparatus while there is touch contact between the digit and the surface of the apparatus.

20. A hand-portable electrically modulated moving touch stimulus apparatus comprising:
a body portion having a smooth surface comprising an optically transparent surface electrode; and
a controller configured to apply a time varying potential difference such that, in use, electric current not exceeding 100 μA flows via first and second surface electrodes of the apparatus to a digit of a user, providing a touch stimulus to the user that is perceptible only when there is relative motion between the digit and the apparatus while there is touch contact between the digit and the surface of the apparatus, and configured to control at least the time variation in the potential difference.

* * * * *